United States Patent
Colaco et al.

(10) Patent No.: US 7,279,446 B2
(45) Date of Patent: Oct. 9, 2007

(54) VISCOELASTIC SURFACTANT FLUIDS HAVING ENHANCED SHEAR RECOVERY, RHEOLOGY AND STABILITY PERFORMANCE

(75) Inventors: Allwyn Colaco, South River, NJ (US); Jean-Pierre Marchand, Princeton, NJ (US); Fang Li, Pleasanton, CA (US); Manilal S. Dahanayake, Princeton Junction, NJ (US)

(73) Assignees: Rhodia Inc., Cranbury, NJ (US); Schlumberger Technology Corporation, Sugarland, TX (US)

( * ) Notice: Subject to any disclaimer, the term of this patent is extended or adjusted under 35 U.S.C. 154(b) by 0 days.

(21) Appl. No.: 11/272,633

(22) Filed: Nov. 14, 2005

(65) Prior Publication Data

US 2006/0105919 A1 May 18, 2006

Related U.S. Application Data

(60) Provisional application No. 60/722,040, filed on Sep. 29, 2005, provisional application No. 60/627,876, filed on Nov. 15, 2004.

(51) Int. Cl.
*C09K 8/66* (2006.01)
(52) U.S. Cl. .................. 507/119; 507/224; 507/110; 507/209
(58) Field of Classification Search ............. 507/110, 507/119, 209, 224
See application file for complete search history.

(56) References Cited

U.S. PATENT DOCUMENTS

| | | | | |
|---|---|---|---|---|
| 5,551,516 A | | 9/1996 | Normal et al. ............. | 166/308 |
| 5,965,502 A | * | 10/1999 | Balzer ...................... | 510/158 |
| 6,153,705 A | | 11/2000 | Corpart et al. ............ | 524/244 |
| 6,258,859 B1 | | 7/2001 | Dahanayake et al. ...... | 516/77 |
| 6,767,869 B2 | | 7/2004 | DiLullo et al. ............ | 507/244 |
| 6,770,607 B2 | * | 8/2004 | Chen et al. ................ | 510/158 |
| 6,840,318 B2 | * | 1/2005 | Lee et al. .................. | 166/293 |
| 6,881,709 B2 | * | 4/2005 | Nelson et al. ............. | 507/203 |
| 6,908,888 B2 | * | 6/2005 | Lee et al. .................. | 507/219 |
| 2003/0134751 A1 | | 7/2003 | Lee et al. .................. | 507/200 |
| 2004/0011527 A1 | * | 1/2004 | Jones et al. ................ | 166/304 |

OTHER PUBLICATIONS

S. Gravsholt, Journal of Coll. And Interface Sci., 57 (3), 575 (1976).
Hoffmann et al., "Influence of Ionic Surfactants on the Viscoelastic Properties of Zwitterionic Surfactant Solutions", Langmuir, 8, 2140-2146 (1992).
Hoffmann et al., The Rheological Behaviour of Different Viscoelastic Surfactant Solutions, Tenside Surf. Det., 31, 289-400, 1944.
"Rheological Measurements", Encyclopedia of Chemical Technology, vol. 21, pp. 347-372, (John Wiley & Sons, Inc., N.Y., N.Y., 1997, 4th ed.).
Schmolka, J. Am. Oil Chem. Soc. 1977, 54, 110.
Wilczek-Veraet et al., Macromolecules 1996, 29, 4036.
Quirk and Lee (Polymer International 27, 359.
Otu et al., Makromol. Chem. Rapid. Commun., 3, 127 (1982).
Webster O.W., "Group Transfer Polymerization", p. 580-588, in the "Encyclopedia of Polymer Science and Engineering", vol. 7, edited by H.F. Mark, N.M. Bikales, C.G. Overberger and G. Menges, Wiley Interscience, New York, 1987.
Radical Polymerization Controlled by Tetraphenylethane Derivatives (D. Braun et al., Macromol. Symp., 111, 63 (1996).
Radical Polymerization Controlled by Organocobalt Complexes (Wayland et al., J. Am. Chem. Soc., 116, 7973 (1994).
(Kennedy, J.P. and Coll. Macromolecules, 29, 8631 (1996).
Deffieux, A. and Coll. Ibid, 25, 6744 (1992).
Gnanou, Y. and Coll. Ibid, 31, 6748 (1998).

* cited by examiner

*Primary Examiner*—Philip C. Tucker

(57) ABSTRACT

A method of treating a subterranean formation by injecting down a well an aqueous fluid containing a viscoelastic surfactant fluid comprising an enhanced shear recovery agent wherein shear recovery time of the viscoelastic surfactant fluid is reduced by the addition of the enhanced shear recovery agent, and a viscoelastic surfactant fluid composition thereof.

11 Claims, No Drawings

VISCOELASTIC SURFACTANT FLUIDS HAVING ENHANCED SHEAR RECOVERY, RHEOLOGY AND STABILITY PERFORMANCE

This patent application claims priority from U.S. Ser. Nos. 60/627,876 filed on Nov. 15, 2004 and 60/722,040 filed on Sep. 29, 2005.

BACKGROUND OF THE INVENTION

1. Field of the Invention

The present invention relates to a method and compositions for enhancing the rheology performance, shear recovery, and stability in viscoelastic surfactant fluids useful for treating formations in oil and gas-wells. More particularly the invention relates to viscoelastic surfactant fluids containing an enhanced shear recovery agent. The enhanced shear recovery agent comprises at least a sugar derived surfactant, a copolymer, or a combination thereof.

2. Description of the Related Art

Viscoelastic surfactant fluids have continued to grow in use in oilfield applications because of their advantages over conventional polymer systems. Such advantages include higher permeability in the oil-bearing zone, lower formation or subterranean damage, higher viscosifier recovery after fracturing, elimination of need for enzymes or oxidizers to break down viscosity, and easier hydration and faster build-up to optimum viscosity.

Viscoelastic surfactant fluids are useful in conventional hydraulic fracturing methods. Useful methods disclosed in U.S. Pat. No. 5,551,516 (Norman et. al.) is incorporated herein by reference. Oilfield applications and methods are described in "Oilfield Applications", *Encyclopedia of Polymer Science and Engineering*, vol. 10, pp. 328-366 (John Wiley & Sons, Inc. New York, N.Y., 1987) and references cited therein, which are also incorporated herein by reference.

Hydraulic fracturing is a term that has been applied to a variety of methods used to stimulate the production of fluids such as oil, natural gas, from subterranean formations. In hydraulic fracturing, a fracturing fluid, usually an aqueous fluid, is injected through a well bore and against the face of the formation at a pressure and flow rate at least sufficient to overcome the overburden pressure and to initiate and/or extend a fracture(s) into the formation. The fracturing fluid usually carries a propant such as 20-40 mesh sand, bauxite, glass beads, etc., suspended in the fracturing fluid and transported into a fracture. The propant keeps the formation from closing back down upon itself when the pressure is released. The propant filled fractures provide permeable channels through which the formation fluids can flow to the well bore and thereafter are withdrawn. When the viscoelastic surfactant fluid is used as a fracturing fluid it may optionally contain a gas such as air, nitrogen or carbon dioxide to provide an energized fluid or foam. Supercritical carbon dioxide emulsion can be also present. In addition, other conventional constituents that perform specific desired functions, e.g., corrosion inhibitors, fluid-loss additives and the like can be present.

Growth in the use of viscoelastic surfactant fluids has been inhibited by the high cost of surfactants required to formulate such fluids. Another problem with use of viscoelastic surfactant fluids is their low shear recovery when subjected to high shear in treatment of subterranean formations. Furthermore, problems persist with use of viscoelastic surfactant fluids because of their low tolerance of organic/ inorganic salts and clay stabilizers, such as potassium chloride (KCl) and tetramethyl ammonium chloride (TMAC), in subterranean formations. In addition, high temperatures encountered, especially up to 250° F., hinder the operation of deep well oilfield applications. These temperatures can break down the viscosity of viscoelastic surfactant fluids and render them ineffective in fracturing operations when viscoelastic surfactants are present at low concentrations in the viscoelastic surfactant fluid. High viscoelastic surfactant concentrations are used to avoid such viscosity breakdown. However use of viscoelastic surfactants at low concentrations in viscoelastic surfactant fluids results in unacceptably long shear recovery times. These unacceptably long shear recovery times hinder the operation of deep well oilfield applications.

In the prior art, attempts have been made to remedy breakdown in viscosity and low shear recovery performance by adding polymers, such as low molecular weight anionic polymers. Polymeric thickeners, e.g. starches, which thicken by entanglement of polymeric chains, have been used to viscosify the aqueous phase of suspensions. Such thickeners can degrade under the influence of mechanical shear or chemical scission (e.g. by oxidation or hydrolysis) of the polymeric chains resulting in loss of viscosity and suspension stability. Still the shear recovery can be unacceptably long and/or organic/inorganic salt tolerance may be inadequate.

In U.S. Patent Application Publication No. 2003/0134751 to Lee et. al., the addition of polymers improved the shear recovery of viscoelastic surfactant fluids. In particular, polymers with higher molecular weights than 25,000 were found to be effective at high concentrations of viscoelastic surfactant fluid. However, at low concentration, these polymers are not effective in sheer recovery.

U.S. Pat. No. 6,258,859 to Dahanayake et. al, discloses viscoelastic surfactant fluids containing amphoteric and zwitterionic surfactants, but the use of sugar derived surfactants, polymers, or combinations thereof for improvement of shear recovery time is not disclosed.

In U.S. Pat. No. 6,767,869 to DiLullo et. al., amphoteric polymers with high molecular weight, 500,000 or above, is added to viscoelastic surfactant fluids in well fracturing fluids. Use of sugar derived surfactants is not apparent from the above invention.

Accordingly, it would be desirable to have a surfactant additive that could be formulated on a cost-effective basis with a viscoelastic surfactant fluid, i.e., with relatively low levels of viscoelastic surfactant to be used in the treatment of subterranean formation in oil and gas wells. Furthermore it is desirable to have good shear recovery comparable to aqueous fluids used in fracturing which contain a relatively high concentration of viscoelastic surfactants. It would further be desirable to have a viscoelastic surfactant fluid that exhibits high tolerance with respect to organic/inorganic salts and clay stabilizers. It would also be desirable to have a single packaged viscoelastic surfactant fluid that could meet various temperature conditions.

SUMMARY OF THE INVENTION

It is an object of the present invention to provide a method of treating a subterranean formation comprising:

injecting down a well an aqueous fluid comprising a viscoelastic surfactant fluid admixed with an enhanced shear recovery agent;

wherein adding an effective amount of the enhanced shear recovery agent reduces shear recovery time of the viscoelastic surfactant fluid.

It is a further object of this invention to provide a viscoelastic surfactant fluid having improved shear recovery after high shear operation at high temperatures.

It is still another object of the present invention to provide a viscoelastic surfactant fluid that can be formulated with a relatively low level of surfactant for cost-effective performance.

It is a further object of the present invention to provide methods of contacting a proppant, and/or a gas with a viscoelastic surfactant fluid in accordance with the invention. Another object of the invention is to provide a method of admixing aqueous supercritical carbon dioxide emulsion or foam with the viscoelastic surfactant fluid. It is desirable that the viscoelastic surfactant fluid has a high tolerance to organic/inorganic salts, such as KCl and TMAC and $Ca^{++}$ and $Mg^{++}$ ions.

Another object of the present invention is to provide a viscoelastic surfactant fluid composition containing an enhanced shear recovery agent and a proppant having enhanced shear recovery suitable for treatment of subterranean oil and gas wells. High tolerance to organic/inorganic salts having a density of about 5 to 20 ppg is a desired feature as well.

Still yet another object of the present invention is to provide a viscoelastic surfactant fluid concentrate containing an enhanced shear recovery agent which is diluted to any suitable concentration.

DETAILED DESCRIPTION OF THE INVENTION

The property of viscoelasticity in general is well known and reference is made to S. Gravsholt, *Journal of Coll. And Interface Sci.*, 57(3), 575 (1976); Hoffmann et al., "Influence of Ionic Surfactants on the Viscoelastic Properties of Zwitterionic Surfactant Solutions", *Langmuir*, 8, 2140-2146 (1992); and Hoffmann et al., "The Rheological Behaviour of Different Viscoelastic Surfactant Solutions", *Tenside Surf. Det.*, 31, 289-400, (1994). Of the test methods specified by these references to determine whether a liquid possesses viscoelastic properties, one test which has been found to be useful in determining the viscoelasticity of an aqueous solution consists of swirling the solution and visually observing whether the bubbles created by the swirling recoil after the swirling is stopped. Any recoil of the bubbles indicates viscoelasticity. Another useful test is to measure the storage modulus (G') and the loss modulus (G") at a given temperature. If G'>G" at some point or over some range of points below about 10 rad/sec, typically between about 0.001 to about 10 rad/sec, more typically between about 0.1 and about 10 rad/sec, at a given temperature and if $G'>10^{-2}$ Pascals, preferably $10^{-1}$ Pascals, the fluid is typically considered viscoelastic at that temperature. Rheological measurements such as G' and G" are discussed more fully in "Rheological Measurements", *Encyclopedia of Chemical Technology*, vol. 21, pp.347-372, (John Wiley & Sons, Inc., 4th ed., New York, N.Y., 1997). To the extent necessary for completion, the above disclosures are expressly incorporated herein by reference.

Viscoelasticity is caused by a different type of micelle formation than the usual spherical micelles formed by most surfactants. Viscoelastic surfactants form worm-like, rod-like or cylindrical micelles in solution. The formation of long, cylindrical micelles creates useful rheological properties. Viscoelastic surfactant solutions exhibits shear thinning behavior, and remain stable despite repeated high shear applications. By comparison, a typical polymeric thickener will irreversibly degrade when subjected to high shear applications.

It has been unexpectedly found that the addition of an enhanced shear recovery agent of the invention to a viscoelastic fluid reduces the shear recovery time of the viscoelastic surfactant fluid compared to a viscoelastic surfactant fluid without the added enhanced shear recovery agent.

In the present invention, the viscoelastic surfactant fluid comprises a surfactant selected from the group consisting of amphoteric surfactant, zwitterionic surfactant, cationic surfactant, anionic surfactant, nonionic surfactant, and combinations thereof. The viscoelastic surfactant fluid optionally contains a water-soluble compound selected from the group consisting of organic acids, organic acid salts, inorganic salts, and combinations thereof. The inorganic salts may be optionally replaced by organic salts. Further the viscolelastic surfactant fluid contains a solvent. The solvent may be water or an organic solvent or a combination thereof. A sharing agent is added to the viscoelastic surfactant fluid in an effective amount to reduce the shear recovery time. An anionic polymer may be optionally present in the viscoelastic surfactant fluid. Additionally a proppant such as 20-40 mesh sand, bauxite, glass beads, etc., may be suspended in the viscoleastic surfacant fluid.

A. Viscoelastic Surfactant

I. Cationic Surfactant

A cationic surfactant has a positively charged moiety regardless of pH. The cationic surfactant is selected from quaternary salts, certain amines and combinations thereof.

The quaternary salts have the structural formula:

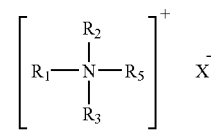

wherein $R_1$, is a hydrophobic moiety of alkyl, alkenyl, alkylarylalkyl, alkoxyalkyl, alkylaminoalkyl or alkylamidoalkyl. $R_1$ has from about 12 to about 30 carbon atoms and may be branched or straight chained and saturated or unsaturated. Representative long chain alkyl groups include octadecenyl (oleyl), octadecyl (stearyl), docosenoic (erucyl) and the derivatives of tallow, coco, soy and rapeseed oils. The preferred alkyl and alkenyl groups are alkyl and alkenyl groups having from about 12 to about 22 carbon atoms.

$R_2$, $R_3$, and $R_5$ are, independently, an aliphatic group (i.e. as opposed to aromatic at the atom bonded to the quaternary nitrogen) having from 1 to about 30 carbon atoms, preferably from about 1 to about 20 carbon atoms, more preferably from about 1 to about 10 carbon atoms, and most preferably from about 1 to about 6 carbon atoms. Representative aliphatic groups include alkyl, alkenyl, alkylaryl, hydroxyalkyl, carboxyalkyl and hydroxyalkyl-polyoxyalkylene. The aliphatic group can be branched or straight-chained and saturated or unsaturated. Preferred alkyl chains are methyl and ethyl. A preferred arylalkyl is benzyl. Preferred hydroxyalkyls are hydroxyethyl and hydroxypropyl. Preferred carboxyalkyls are acetate and propionate. Preferred hydroxyalkyl-polyoxyalkylenes are hydroxyethyl-polyoxyethylene and hydroxypropyl-polyoxyethylene.

$X^-$ is a suitable counter-anion, such as $Cl^-$, $Br^-$, and $(CH_3)_2SO_4^-$.

Representative quaternary salts of the above structure include methylpolyoxyethylene (12-18) octadecaneammonium chloride, methylpolyoxyethylene (2-15) cocoalkylammonium chloride, and isotridecyloxypropyl polyoxyethylene (2-15) methyl ammonium chloride.

The amines have the following structural formula:

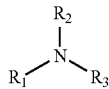

wherein $R_1$, $R_2$ and $R_3$ have been defined previously herein.

Representative amines of the above structure include polyoxyethylene (2-15) cocoalkylamines, polyoxyethylene (12-18) tallow alkylamines, and polyoxyethylene (2-15) oleylamines.

II. Zwitterionic Surfactant

A zwitterionic surfactant has a permanently positively charged moiety in the molecule regardless of pH and a negatively charged moiety at alkaline pH. Selected zwitterionic surfactants useful in the viscoelastic surfactant fluid of the present invention are represented by the following structural formula:

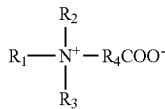

wherein $R_1$ $R_2$ and $R_3$ are as described previously herein.

Representative aliphatic groups include alkyl, alkenyl, alkylaryl, hydroxyalkyl, carboxy alkyl and hydroxyalkyl-polyoxyalkylene. Preferred alkyl chains are methyl and ethyl. A preferred arylalkyl is benzyl. Preferred hydroxyalkyls are hydroxyethyl and hydroxypropyl. Preferred carboxyalkyls are acetate and propionate. Preferred hydroxyalkyl-polyoxyalkylenes are hydroxyethyl-polyoxyethylene and hydroxypropyl-polyoxyethylene.

$R_4$ is a hydrocarbyl radical (e.g. alkylene) with chain length 1 to 4 carbon atoms. Preferred are methylene or ethylene groups.

Specific examples of selected zwitterionic surfactants include the following structures:

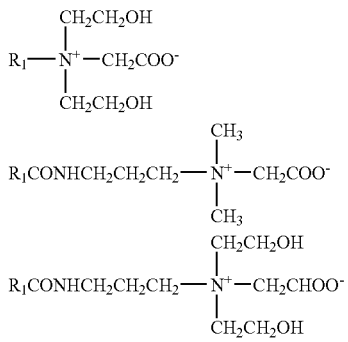

wherein $R_1$ has been previously defined herein.

Other representative zwitterionic surfactants include dihydroxyethyl tallow glycinate, oleamidopropyl betaine, and erucyl amidopropyl betaine.

In addition, zwitterionic surfactants include amine oxide. The amine oxide has the following structural formula:

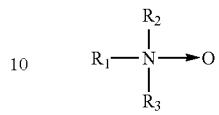

wherein $R_1$, $R_2$ and $R_3$ have been previously defined herein.

III. Amphoteric Surfactant

An amphoteric surfactant has both a positively charged moiety and a negatively charged moiety over a certain pH range (e.g. typically slightly acidic), only a negatively charged moiety over a certain pH range (e.g. typically slightly alkaline) and only a positively charged moiety at a different pH range (e.g. typically moderately acidic).

Selected amphoteric surfactants useful in the viscoelastic surfactant fluid of the present invention are represented by the following structural formula:

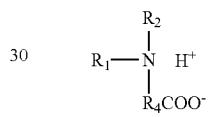

wherein $R_1$, $R_2$, and $R_4$ has been previously defined herein.

Specific examples of amphoteric surfactants include the following structural formulas:

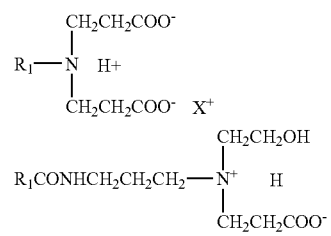

wherein $R_1$ has been previously defined herein, and $X^+$ is an inorganic cation such as $Na^+$, $K^+$, $NH^+$ associated with a carboxylate group or hydrogen atom in an acidic medium.

IV. Anionic Surfactant

An anionic surfactant has a permanent negatively charged moiety in the molecule regardless of pH. Selected anionic surfactants useful in the viscoelastic surfactant fluid of the present invention include those having alkyl chains of about 6 to about 18 carbon atoms with at least one negatively charged moiety.

Representative anionic surfactants include those of the following structural formulas:

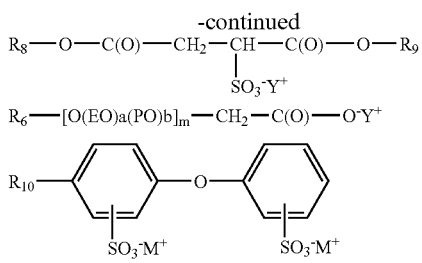

and combinations thereof.

$R_6$ is selected from a group consisting of alkyl, aryl, alkaryl, alkylarylalkyl, arylalkyl, alkylamidoalkyl, alkylaminoalkyl; wherein the alkyl group has about 6 to about 18 carbon atoms; wherein the aryl group represents a phenyl, diphenyl, diphenylether, or naphthalene moiety; and wherein the total carbon atom content of $R_6$ is no more than about 18 carbon atoms. $R_6$ is preferably $C_{10}$ to $C_{18}$ alkyl or alkylamidoalkyl. $R_6$ can be represented by octyl, nonyl, decyl, dodecyl, and the like. Substitutes from natural sources having mixed carbon chain lengths can be used or purified to reduce the number of carbon chain lengths in the alkyl groups. Preferred alkylamidoalkyls are coco/lauryl amidopropyl, oleyl/stearyl amidopropyl, octylamidopropyl, and decylamidopropyl.

M represents hydrogen, an alkali metal such as sodium or potassium, or —[$R_7$-(EO)a(PO)b(BO)c]m-O-]q-P(O)(OM)$_2$.

Y represents a counter-ion, which is preferably an alkali metal such as sodium or potassium, more preferably sodium; EO represents ethyleneoxy radicals, PO represents propyleneoxy radicals. BO represents butoxy radicals. The letters "a", "b", and "c" are, independently, integers from 0 to 50, wherein "a" is preferably an integer from 0 to 15 and "b" is preferably an integer from 0 to 10, and c is preferably an integer from 0 to 10, wherein EO, PO and BO, radicals can be randomly mixed or in discrete blocks. m is 0 or 1. $R_7$ is $C_8$-$C_{18}$ alkylene. $R_8$ is $C_8$-$C_{18}$ alkyl or $C_8$-$C_{18}$ alkylamido. $R_9$ is $C_1$-$C_4$ alkyl or Y (counter-ion). $R_{10}$ is $C_8$-$C_{14}$ alkyl. "q" is an integer from 1 to 10.

V. Nonionic Surfactant

A nonionic surfactant does not have any charged moiety in the molecule. Nonionic surfactants include but not limited to condensation products of ethylene oxide and/or propylene oxide with long chain alcohols.

Selected nonionic surfactants have the structures:

where $R_{11}$ is hydrogen or a hydrocarbon chain containing about 1 to about 5 carbon atoms and may be branched or straight chained and saturated or unsaturated; "n" and "p" may be from 1 to 30, preferably from 5 to 30, more preferably from 15 to 30.

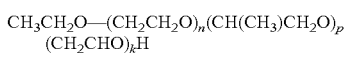

wherein "n", "p", and "k" represent the number of the repeating units and each are from about 5 to about 150.

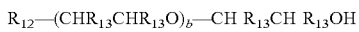

wherein $R_{12}$ represents alkyl, alkenyl, arylalkyl, and hydroxyalkyl wherein each of said alkyl groups contain from about 8 to about 24 carbon atoms, more preferably at least 16 carbon atoms, and may be branched or straight chained and saturated or unsaturated, and wherein said the branch alkyl groups have from about 1 to about 6 carbon atoms; and "b" can be 1 to about 40. Representative of alkyl group for $R_{12}$ include decyl, dodecyl, tetradecyl(myristyl), hexadecyl(cetyl), octadecyl(oleyl), stearyl, erucyl, and the derivatives of coco, tallow, soy, and rapeseed oils. $R_{13}$ is hydrogen or a hydrocarbon chain or group of less than about 7 carbon atoms.

Further examples of non ionic surfactants include ethylene oxide derivatives of octanol and longer chain aliphatic alcohols, propylene oxide derivatives of octanol and longer chain aliphatic alcohols, and mixed oxide derivatives of longer chain aliphatic alcohol.

The surfactants, in combination with the other ingredients such as the anionic polymer, are used in an amount sufficient to form a viscoelastic surfactant fluid. The surfactant amount will preferably be a minor amount by weight of the viscoelastic surfactant fluid (e.g., less than about 50% by weight). The concentration of the surfactant is given in weight % (wt %) and is the total active surfactant exclusive of the solvents, and is based on the weight of the visoelastic surfactant fluid. The total concentration of the selected zwitterionic, amphoteric, cationic, anionic and nonionic surfactants preferably ranges from about 0.1 to about 10 wt %, more preferably from about 0.1 to about 5 wt %, and even more preferably of from about 0.2 to about 3 wt %.

Zwitterionic surfactant preferably ranges from about 0.1 to about 10 wt %, more preferably from about 0.1 to about 5 wt %, and even more preferably from about 0.15 to about 2 wt %. Amphoteric surfactant preferably ranges from about 0.1 to about 5 wt % more preferably from about 0.1 to about 2 wt %, and even more preferably from about 0.1 to about 1 wt %. Cationic surfactant preferably ranges from 0.1 to about 5wt % more preferably from about 0.1 to about 2 wt %, and even more preferably from about 0.1 to about 1 wt %. Anionic surfactant preferably ranges from about 0.1 to about 10 wt % more preferably from about 0.1 to about 2 wt %, and even more preferably from about 0.1 to about 1 wt %. Nonionic surfactant preferably ranges from 0.1 to about 10 wt % more preferably from about 0.1 to about 5 wt %, and even more preferably from about 0.1 to about 1 wt %. All wt % of active surfactant amount is based on the weight of the viscoelastic surfactant fluid. Because of the cost of the surfactants, it is desirable, if possible, to minimize surfactant concentration.

Solvent in the viscoelastic surfactant fluid may be water and/or an organic solvent. Preferably water will be present in the greatest concentration and is preferably present in an amount by weight greater than or equal to about 50 wt % of the viscoelastic fluid. Most preferred amount of water is of about 70-98 wt %. The water can be from any source so long as the source contains no contaminants that are incompatible with the other components of the viscoelastic fluid (e.g., by causing undesirable precipitation). Thus, the water need not be potable and may be brackish or contain other materials typical of sources of water found in or near oil fields.

B. Enhanced Shear Recovery Agent

An enhanced shear recovery agent in accordance with the invention is selected from a sugar derived surfactant, a copolymer derived from at least one ethyleneglycolethyletheracrylate (EGA) monomer, or a combination thereof. Preferred sugar derived surfactants and EGA copolymers are described herein below.

I. Sugar Derived Surfactants

The sugar derived surfactant comprises of alkyl polyglycoside, alkyl polyglucoside, alkyl polyglucomide and all glucomides that consists of cyclic forms of glucose in which the hydrogen of the hemi-acetal group has been replaced with an alkyl or aryl moiety. The compounds would therefore be structurally represented as follows:

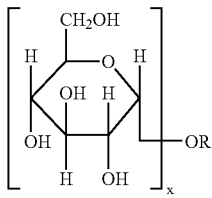

wherein R is a $C_4$ to $C_{12}$ straight or branched chain alkyl group and "x" is a number from about 1 to about 20. More specifically, alkyl poly glucomides would be structurally represented as:

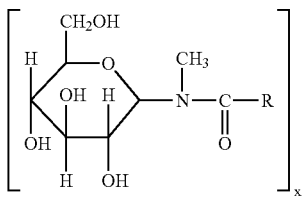

wherein R and "x" have been defined in the above polyglycoside structure.

The glucomide can also exist in the open ring form when hydrated as represented by:

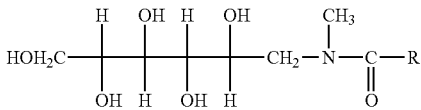

wherein R and "x" have been defined in the above polyglycoside structure.

Representative sugar derived surfactants are $C_9$ to $C_{11}$ alkyl polyglycoside (APG 325); alkyl glycoside (Glucopon 225); and $C_8$ to $C_{10}$ alkyl polyglucoside (Triton BG10).

II. EGA Copolymers

The parts of a copolymer having a controlled structure can be for example blocks, linear backbones, side chains, grafts, <<hair>>or branches of microgels or stars, cores of microgels of stars, or parts of polymeric chains having different concentrations of different units. Thus, the copolymer can have one of the following structures:

block copolymer comprising at least two blocks, part A corresponding to one block, part B corresponding to another block, whereby at least Part A or Part B is derived from an ethyleneglycolethyletheracrylate (EGA) monomer and part A having optionally a composition gradient, comb copolymer or grafted copolymer, having a backbone and side chains, with part A corresponding to the backbone and part B corresponding to side chains, or with part B corresponding to the skeleton and part A corresponding to side chains, whereby at least one of Part A or Part B is derived from an EGA monomer star copolymer or microgel copolymer or gelled micelle copolymer, comprising a polymeric core or non polymeric core, and peripheral polymeric chains, one part A or B corresponding to the core, and the other part corresponding to peripheral polymeric chains, whereby at least one of Part A or Part B is derived from an EGA monomer.

In a preferred embodiment, the copolymer is a block copolymer. By block copolymer, it is meant a copolymer comprising at least two different blocks, block A and block B, linked together. The block copolymer is a sequenced polymer, for example a di-block or a tri-block copolymer. Blocks may also be random copolymers. Examples of preferred linear sequences block copolymers are (block A)-(block B) di-block copolymers, (block A)-(block B)-(block A) tri-block copolymers, and (block B)-(block A)-(block B) tri-block copolymers. By linear polymer, it is meant a linear homopolymer, or a linear random copolymer, as opposed to a block copolymer.

A block or part is usually defined by the repeating units it comprises. A block or part may be a copolymer, comprising several kind of repeating units, deriving form several monomers. Hence, block or part A and block or part B may be different polymers, deriving from different monomers, but they may comprise some common repeating units (copolymers). Block or part A and block or part B preferably does not comprise more than 50% of a common repeating unit (deriving from the same monomer).

Part A, for example block A, is hydrophilic or hydrophobic. Part B, for example block B is hydrophilic or hydrophobic. Hydrophilic or Hydrophobic properties of a block or part refer to the property said block or part would have without the other block or part that is the property of a polymer consisting of the same repeating units than said block or part, having the same molecular weight. By hydrophilic block, part, polymer or copolymer, it is meant that the block, part, polymer or copolymer does not phase separate macroscopically in water at a concentration from 0.01% and 10% by weight, at a temperature from 20° C. to 30° C. By hydrophobic block, part, polymer or copolymer, it is meant that the block, part, polymer or copolymer does phase separate macroscopically in the same conditions.

In an interesting embodiment, part A, for example block A is a hydrophilic part, for example a hydrophilic block, and part B, for example block B, is a hydrophobic part, for example a hydrophobic block.

In accordance with the invention at least one Part A and Part B is derived from an EGA monomer. In a preferred embodiment Part B, for example block B comprises units deriving from a monomer B having the following formula: CH2=CR1CO—[O—(CH2)p-]nOR2 wherein:
R1 is hydrogen or a methyl group,
p, which is identical or different, is 2 or 3,
n is an average number being greater than or equal to 1, and
R2 is an alkyl group.

The group R2 is an alkyl group such as a methyl group, an ethyl group or a propyl group. The number p is 2 or 3. It means that the group [O—(CH2)p-] is an ethoxy group (p=2) or a propoxy group (p=3). As p can be identical or different, the sequence of formula —[O—(CH2)p-]n is a sequence having ethoxy groups and or propoxy groups. If the sequence has ethoxy and propoxy groups, the sequence can be a random sequence or a block sequence (one or several block of ethoxy groups and one or several block of propoxy groups). The number p could have been also defined as an average number being of from 2 to 3.

In a preferred embodiment, n is greater than or equal to 2, and R2 is a methyl group or an ethyl group. The value of n can be of up to 25 or even more. For example n can be of about 2, 3, 4, 5, 6, 7, 8, 9, 10, 12, 14, 18, 20, 22, or 25.

In a preferred embodiment p is 2, n is greater than or equal to 2, and R2 is a methyl group or an ethyl group. Diethyleneglycolethyletheracrylate (DEGA) is an example of a useful monomer B. Methoxyethylacrylate is not especially recommended. Nonethyleneglycolmethyletheracrylate (nEGA) or poly-23-EGA are other examples of useful monomer B.

It is mentioned that monomer B provides advantages over monomers having dangling hydroxy groups such as hydroxyethyl(meth) acrylates and polythoxylated compounds: monomer B provides a very-low side reaction cross-linking.

In an interesting embodiment:
part A, for example block A, is a hydrophilic part, for example block,
part B, for example block B, is a hydrophobic part, for example block, and
monomer B is diethyleneglycolethyletheracrylate or diethyleneglycolethylethermethacrylate.

Part B, for example block B, may comprise further units, for example units deriving from a hydrophobic or hydrophilic monomer. Examples of hydrophilic monomers are listed below for part A, for example block A. In a particular embodiment, part B, for example block B, is a copolymer, for example random or gradient, comprising units deriving from monomer B and other units deriving from a hydrophobic or hydrophilic monomer. Having said further units in part B, for example block B, helps in further tuning the properties of the polymer, for example adsorption properties onto a solid or liquid surface, solubility/compatibility with other compounds. These adsorption properties are useful in designing formulations having a compound to be deposited onto a solid surface, in designing formulations having solid particles dispersed in an liquid (tuning the properties of the copolymer as a dispersant), and in designing formulations in the form of an emulsions (tuning the properties of the copolymer as an emulsifier or as a co-emulsifier).

Examples of hydrophobic units (in part A, for example block A, or in part A, for example block B), deriving from hydrophobic monomers, include units deriving form hydrophobic monomers selected from the group consisting of:
alkylesters of an alpha-ethylenically-unsaturated, preferably mono-alpha-ethylenically-unsaturated, monocarboxylic acid, such as methylacrylate, ethylacrylate, n-propylacrylate, n-butylacrylate, methylmethacrylate, ethylmethacrylate, n-propylmethacrylate, n-butylmethacrylate, and 2-ethyl-hexyl acrylate, 2-ethyl-hexyl methacrylate, isooctyl acrylate, isooctyl methacrylate, lauryl acrylate, lauryl methacrylate,
vinyl versatate,
acrylonitrile,
vinyl nitriles, comprising from 3 to 12 carbon atoms,
vinylamine amides, and
vinylaromatic compounds such as styrene.

Preferably, part A, for example block A, comprises repeating units deriving from monomers selected from the group consisting of:
ethylene oxide,
vinyl alcohol,
vinyl pyrrolidone,
acrylamide, methacrylamide,
polyethylene oxide (meth)acrylate (i.e. polyethoxylated (meth)acrylic acid),
hydroxyalkylesters of alpha-ethylenically-unsaturated, preferably mono-alpha-ethylenically-unsaturated, monocarboxylic acids, such as 2-hydroxyethylacrylate, and
hydroxyalkylamides of alpha-ethylenically-unsaturated, preferably mono-alpha-ethylenically-unsaturated, monocarboxylic acids,
dimethylaminoethyl (meth)acrylate, dimethylaminopropyl (meth)acrylate, ditertiobutylaminoethyl (meth)acrylate, dimethylaminomethyl (meth)acrylamide, dimethylaminopropyl (meth)acrylamide;
ethylenimine, vinylamine, 2-vinylpyridine, 4-vinylpyridine;
trimethylammonium ethyl (meth)acrylate chloride, trimethylammonium ethyl (meth)acrylate methyl sulphate, dimethylammonium ethyl (meth)acrylate benzyl chloride, 4-benzoylbenzyl dimethylammonium ethyl acrylate chloride, trimethyl ammonium ethyl (meth)acrylamido (also called 2-(acryloxy) ethyltrimethylammonium, TMAEAMS) chloride, trimethylammonium ethyl (meth)acrylate (also called 2-(acryloxy)ethyltrimethylammonium, TMAEAMS) methyl sulphate, trimethyl ammonium propyl (meth)acrylamido chloride, vinylbenzyl trimethyl ammonium chloride,
diallyldimethyl ammonium chloride,
monomers having the following formula:
wherein
R1 is a hydrogen atom or a methyl or ethyl group;
R2, R3, R4, R5 and R6, which are identical or different, are linear or branched C1 C6, preferably C1 C4, alkyl, hydroxyalkyl or aminoalkyl groups;
m is an integer from 1 to 10, for example 1;
n is an integer from 1 to 6, preferably 2 to 4;
Z represents a —C(O)O or —C(O)NH group or an oxygen atom;
A represents a (CH2)p group, p being an integer from 1 to 6, preferably from 2 to 4;
B represents a linear or branched C2 C 12, advantageously C3 C6, polymethylene chain optionally interrupted by one or more heteroatoms or heterogroups, in particular O or NH, and optionally substituted by one or more hydroxyl or amino groups, preferably hydroxyl groups;
X, which are identical or different, represent counter-ions, and
their mixtures, and macromonomers deriving therefrom,
alpha-ethylenically-unsaturated, preferably mono-alpha-ethylenically-unsaturated, monomers comprising a phosphate or phosphonate group,
alpha-ethylenically-unsaturated, preferably mono-alpha-ethylenically-unsaturated, monocarboxylic acids, such as acrylic acid, methacrylic acid
monoalkylesters of alpha-ethylenically-unsaturated, preferably mono-alpha-ethylenically-unsaturated, dicarboxylic acids,
monoalkylamides of alpha-ethylenically-unsaturated, preferably mono-alpha-ethylenically-unsaturated, dicarboxylic acids,
alpha-ethylenically-unsaturated, preferably mono-alpha-ethylenically-unsaturated, compounds comprising a sulphonic acid group, and salts of alpha-ethylenically-unsaturated, preferably mono-alpha-ethylenically-unsaturated, compounds comprising a sulphonic acid group, such as vinyl sulphonic acid, salts of vinyl sulfonic acid, vinylbenzene sulphonic acid, salts of vinylbenzene sulphonic acid, alpha-acrylamidomethylpropanesulphonic acid, salts of alpha-acrylamidomethylpropanesulphonic acid 2-sulphoethyl methacrylate, salts of 2-sulphoethyl methacrylate, acrylamido-2-methylpropanesulphonic acid (AMPS), salts of acrylamido-2-methylpropanesulphonic acid, and styrenesulfonate (SS)

Part A, for example block A, more preferably comprises units deriving from monomers selected from the group consisting of:
  acrylic acid, methacrylic acid,
  acrylamide, methacrylamide,
  vinyl sulphonic acid, salts of vinyl sulfonic acid,
  vinylbenzene sulphonic acid, salts of vinylbenzene sulphonic acid,
  alpha-acrylamidomethylpropanesulphonic acid, salts of alpha-acrylamidomethylpropanesulphonic acid
  2-sulphoethyl methacrylate, salts of 2-sulphoethyl methacrylate,
  acrylamido-2-methylpropanesulphonic acid (AMPS), salts of acrylamido-2-methylpropanesulphonic acid, and
  styrenesulphonate (SS).

Monomer B is a neutral monomer. Thus part B, for example block B, can be neutral. Par B, for example block B is preferably a neutral block. However it is not excluded that part B, for example block B comprises other units than units deriving from monomer B, said units being neutral, anionic or cationic). Part A, for example block A might be discriminated as regard to its electrical behavior or nature. It means that block A may be a neutral block, or a polyionic block (a polyanionic block, or a polycationic block). It is further mentioned the electrical behavior or nature (neutral, polyanionic or polycationic) may depend on the pH of the emulsion. By polyionic it is meant that the block comprises ionic (anionic or cationic) repetitive units whatever the pH, or that the block comprises repetitive units that may be neutral or ionic (anionic or cationic) depending on the pH of the emulsion (the units are potentially ionic). A unit that may be neutral or ionic (anionic or cationic), depending on the pH of the composition, will be thereafter referred as an ionic unit (anionic or cationic), or as a unit deriving from an ionic monomer (anionic or cationic), whatever it is in a neutral form or in an ionic form (anionic or cationic).

Examples of polycationic parts, for example blocks, are parts, for example blocks, comprising units deriving from cationic monomers such as:
  aminoalkyl (meth)acrylates, aminoalkyl (meth)acrylamides,
  monomers, including particularly (meth)acrylates, and (meth)acrylamides derivatives, comprising at least one secondary, tertiary or quaternary amine function, or a heterocyclic group containing a nitrogen atom, vinylamine or ethylenimine;
  diallyldialkyl ammonium salts;
  their mixtures, their salts, and macromonomers deriving from therefrom.

Examples of cationic monomers include:
  dimethylaminoethyl (meth)acrylate, dimethylaminopropyl (meth)acrylate, ditertiobutylaminoethyl (meth)acrylate, dimethylaminomethyl (meth)acrylamide, dimethylaminopropyl (meth)acrylamide;
  ethylenimine, vinylamine, 2-vinylpyridine, 4-vinylpyridine;
  trimethylammonium ethyl (meth)acrylate chloride, trimethylammonium ethyl (meth)acrylate methyl sulphate, dimethylammonium ethyl (meth)acrylate benzyl chloride, 4-benzoylbenzyl dimethylammonium ethyl acrylate chloride, trimethyl ammonium ethyl (meth)acrylamido (also called 2-(acryloxy) ethyltrimethylammonium, TMAEAMS) chloride, trimethylammonium ethyl (meth)acrylate (also called 2-(acryloxy)ethyltrimethylammonium, TMAEAMS) methyl sulphate, trimethyl ammonium propyl (meth) acrylamido chloride, vinylbenzyl trimethyl ammonium chloride,
  diallyldimethyl ammonium chloride,
  monomers having the following formula:
  wherein
  R1 is a hydrogen atom or a methyl or ethyl group;
  R2, R3, R4, R5 and R6, which are identical or different, are linear or branched C1 C6, preferably C1 C4, alkyl, hydroxyalkyl or aminoalkyl groups;
  m is an integer from 1 to 10, for example 1;
  n is an integer from 1 to 6, preferably 2 to 4;
  Z represents a —C(O)O or —C(O)NH group or an oxygen atom;
  A represents a (CH2)p group, p being an integer from 1 to 6, preferably from 2 to 4;
  represents a linear or branched C2 C12, advantageously C3 C6, polymethylene chain optionally interrupted by one or more heteroatoms or heterogroups, in particular O or NH, and optionally substituted by one or more hydroxyl or amino groups, preferably hydroxyl groups;
  X, which are identical or different, represent counter-ions, and
  their mixtures, and macromonomers deriving therefrom.

Examples of anionic parts, for example blocks, are parts, for example blocks, comprising units deriving from anionic monomers selected from the group consisting of:
  alpha-ethylenically-unsaturated, preferably mono-alpha-ethylenically-unsaturated, monomers comprising a phosphate or phosphonate group,
  alpha-ethylenically-unsaturated, preferably mono-alpha-ethylenically-unsaturated, monocarboxylic acids,
  monoalkylesters of alpha-ethylenically-unsaturated, preferably mono-alpha-ethylenically-unsaturated, dicarboxylic acids,
  monoalkylamides of alpha-ethylenically-unsaturated, preferably mono-alpha-ethylenically-unsaturated, dicarboxylic acids,
  alpha-ethylenically-unsaturated, preferably mono-alpha-ethylenically-unsaturated, compounds comprising a sulphonic acid group, and salts of alpha-ethylenically-unsaturated compounds comprising a sulphonic acid group.

Preferred anionic parts, for example blocks, include parts, for example blocks, comprising deriving from at least one anionic monomer selected from the group consisting of:
  acrylic acid, methacrylic acid,
  vinyl sulphonic acid, salts of vinyl sulfonic acid,
  vinylbenzene sulphonic acid, salts of vinylbenzene sulphonic acid,
  alpha-acrylamidomethylpropanesulphonic acid, salts of alpha-acrylamidomethylpropanesulphonic acid
  2-sulphoethyl methacrylate, salts of 2-sulphoethyl methacrylate,
  acrylamido-2-methylpropanesulphonic acid (AMPS), salts of acrylamido-2-methylpropanesulphonic acid, and
  styrenesulfonate (SS).

Examples of neutral units (in part A, for example block A, or other units in part B, for example block B) include the units deriving from at least one monomer selected from the group consisting of:

- acrylamide, methacrylamide,
- amides of alpha-ethylenically-unsaturated, preferably mono-alpha-ethylenically-unsaturated, monocarboxylic acids,
- esters of an alpha-ethylenically-unsaturated, preferably mono-alpha-ethylenically-unsaturated, monocarboxylic acid, for example alkyl esters such as such as methylacrylate, ethylacrylate, n-propylacrylate, n-butylacrylate, methylmethacrylate, ethylmethacrylate, n-propylmethacrylate, n-butylmethacrylate, 2-ethylhexyl acrylate, or hydroxyalkyl esters such as 2-hydroxyethylacrylate,
- polyethylene and/or polypropylene oxide (meth)acrylates (i.e. polyethoxylated and/or polypropoxylated (meth)acrylic acid),
- vinyl alcohol,
- vinyl pyrrolidone,
- vinyl acetate, vinyl versatate,
- vinyl nitriles, preferably comprising from 3 to 12 carbon atoms,
- acrylonitrile,
- vinylamine amides,
- vinyl aromatic compounds, such as styrene, and
- mixtures thereof.

Part A, for example block A, and/or part B, for example block B, preferably derive from mono-alpha-ethylenically unsaturated monomers. More precisely, it is meant that for part A, for example block A, and/or part B, for example block B, at least 50% of the repeating units preferably are mono-alpha-ethylenically-unsaturated monomers derived units. The monomers listed above are mono-alpha-unsaturated monomers, except propylene oxide and ethylene oxide. It is mentioned than monomer B is a mono-alpha-ethylenically unsaturated monomer. Of course, it is not excluded that part A, for example block A, comprises both units deriving from hydrophobic and hydrophilic monomers.

The copolymers according to the invention can be obtained by any suitable method, for example by free-radicals polymerization, controlled or not, or by ring-opening polymerization (including anionic or cationic polymerization), or by anionic or cationic polymerization, or by chemical modification of a polymer. Free-radicals polymerizations, referred to as "living" or "controlled" are preferred. There are several methods for making block copolymers. Some methods for making such copolymers are provided below.

It is possible for example to use anionic polymerization with sequential addition of 2 monomers as described for example by Schmolka, J. Am. Oil Chem. Soc. 1977, 54, 110; or alternatively Wilczek-Veraet et al., Macromolecules 1996, 29, 4036. Another method which can be used consists in initiating the polymerization of a block polymer at each of the ends of another block polymer as described for example by Katayose and Kataoka, Proc. Intern. Symp. Control. Rel. Bioact. Materials, 1996, 23, 899.

In the context of the present invention, it is recommended to use living or controlled polymerization as defined by Quirk and Lee (Polymer International 27, 359 (1992)). Indeed, this particular method makes it possible to prepare polymers with a narrow dispersity and in which the length and the composition of the blocks are controlled by the stoichiometry and the degree of conversion. In the context of this type of polymerization, there are more particularly recommended the copolymers which can be obtained by any so-called living or controlled polymerization method such as, for example:

- free-radical polymerization controlled by xanthates according to the teaching of Application WO 98/58974 and U.S. Pat. No. 6,153,705,
- free-radical polymerization controlled by dithioesters according to the teaching of Application WO 98/01478,
- free-radical polymerization controlled by dithioesters according to the teaching of Application WO 99/35178,
- free-radical polymerization controlled by dithiocarbamates according to the teaching of Application WO 99/35177,
- free-polymerization using nitroxide precursors according to the teaching of Application WO 99/03894,
- free-radical polymerization controlled by dithiocarbamates according to the teaching of Application WO 99/31144,
- free-radical polymerization controlled by dithiocarbazates according to the teaching of Application WO 02/26836,
- free-radical polymerization controlled by halogenated Xanthates according to the teaching of Application WO 00/75207 and U.S. application Ser. No. 09/980,387,
- free-radical polymerization controlled by dithiophosphoroesters according to the teaching of Application WO 02/10223,
- free-radical polymerization controlled by a transfer agent in the presence of a disulphur compound according to the teaching of Application WO 02/22688,
- atom transfer radical polymerization (ATRP) according to the teaching of Application WO 96/30421,
- free-radical polymerization controlled by iniferters according to the teaching of Otu et al., Makromol. Chem. Rapid. Commun., 3, 127 (1982),
- free-radical polymerization controlled by degenerative transfer of iodine according to the teaching of Tatemoto et al., Jap. 50, 127, 991 (1975), Daikin Kogyo Co Ltd Japan, and Matyjaszewski et al., Macromolecules, 28, 2093 (1995),
- group transfer polymerization according to the teaching of Webster O. W., "Group Transfer Polymerization", p. 580-588, in the "Encyclopedia of Polymer Science and Engineering", Vol. 7, edited by H. F. Mark, N. M. Bikales, C. G. Overberger and G. Menges, Wiley Interscience, New York, 1987,
- radical polymerization controlled by tetraphenylethane derivatives (D. Braun et al., Macromol. Symp., 111, 63 (1996)),
- radical polymerization controlled by organocobalt complexes (Wayland et al., J. Am. Chem. Soc., 116, 7973 (1994)).

Preferred processes are sequenced living free-radical polymerization processes, involving the use of a transfer agent. Preferred transfer agents are agents comprising a group of formula —S—C(S)—Y—, —S—C(S)—S—, or —S—P(S)—Y—, or —S—P(S)—S—, wherein Y is an atom different from sulfur, such as an oxygen atom, a nitrogen atom, and a carbon atom. They include dithioester groups, thioether-thione groups, dithiocarbamate groups, dithiphosphoroesters, dithiocarbazates, and xanthate groups. Examples of groups comprised in preferred transfer agents include groups of formula —S—C(S)—NR—NR'2, —S—C(S)—NR—N=CR'2, —S—C(S)—O—R, —S—C(S)—CR=CR'2, and —S—C(S)—X, wherein R and R' are or identical or different hydrogen atoms, or organic groups such as hydrocarbyl groups, optionally substituted, optionally comprising heteroatoms, and X is an halogen atom. A preferred polymerization process is a living radical polymerization using xanthates.

Copolymers obtained by a living or controlled free-radical polymerization process may comprise at least one transfer agent group at an end of the polymer chain. In particular embodiment such a group is removed or deactivated.

A "living" or "controlled" radical polymerization process used to make the block copolymers comprises the steps of:

a) reacting a mono-alpha-ethylenically-unsaturated monomer, at least a free radicals source compound, and a transfer agent, to obtain a first block, the transfer agent being bounded to said first block, b1) reacting the first block, another mono-alpha-ethylenically-unsaturated monomer, and, optionally, at least a radical source compound, to obtain a di-block copolymer, b2) optionally, repeating n times (n being equal to or greater than 0) step b1) to obtain a (n-2)-block copolymer, and then c) optionally, reacting the transfer agent with means to render it inactive.

For example, a "living" or "controlled" radical polymerization process used to make the di-block copolymers comprises the steps of:

a) reacting a mono-alpha-ethylenically-unsaturated monomer, at least a free radicals source compound, and a transfer agent, to obtain a first block, the transfer agent being bounded to said first block, b) reacting the first block, another mono-alpha-ethylenically-unsaturated monomer, and, optionally, at least a radical source compound, to obtain a di-block copolymer, and then c) optionally, reacting the transfer agent with means to render it inactive.

During step a), a first block of the polymer is synthesized. During step b), b1), or b2), another block of the polymer is synthesized.

Examples of transfer agents are transfer agents of the following formula (I):

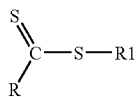

(I)

wherein:

R represents an R2O—, R2R'2N— or R3-group, R2 and R'2, which are identical or different, representing (i) an alkyl, acyl, aryl, alkene or alkyne group or (ii) an optionally aromatic, saturated or unsaturated carbonaceous ring or (iii) a saturated or unsaturated heterocycle, it being possible for these groups and rings (i), (ii) and (iii) to be substituted, R3 representing H, Cl, an alkyl, aryl, alkene or alkyne group, an optionally substituted, saturated or unsaturated (hetero)cycle, an alkylthio, alkoxycarbonyl, aryloxycarbonyl, carboxyl, acyloxy, carbamoyl, cyano, dialkyl- or diarylphosphonato, or dialkyl- or diarylphosphinato group, or a polymer chain, R1 represents (i) an optionally substituted alkyl, acyl, aryl, alkene or alkyne group or (ii) a carbonaceous ring which is saturated or unsaturated and which is optionally substituted or aromatic or (iii) an optionally substituted, saturated or unsaturated heterocycle or a polymer chain, and the R1, R2, R'2 and R3 groups can be substituted by substituted phenyl or alkyl groups, substituted aromatic groups or the following groups: oxo, alkoxycarbonyl or aryloxycarbonyl (—COOR), carboxyl (—COOH), acyloxy (—O2CR), carbamoyl (—CONR2), cyano (—CN), alkylcarbonyl, alkylarylcarbonyl, arylcarbonyl, arylalkylcarbonyl, isocyanato, phthalimido, maleimido, succinimido, amidino, guanidino, hydroxyl (—OH), amino (—NR2), halogen, allyl, epoxy, alkoxy (—OR), S-alkyl, S-aryl or silyl, groups exhibiting a hydrophilic or ionic nature, such as alkaline salts of carboxylic acids or alkaline salts of sulphonic acid, poly(alkylene oxide) (PEO, PPO) chains, or cationic substituents (quaternary ammonium salts), R representing an alkyl or aryl group.

Preferably, the transfer agent of formula (I) is a dithiocarbonate chosen from the compounds of following formulae (IA), (IB) and (IC):

(IA)

(IB)

(IC)

wherein:

R2 and R2' represent (i) an alkyl, acyl, aryl, alkene or alkyne group or (ii) an optionally aromatic, saturated or unsaturated carbonaceous ring or (iii) a saturated or unsaturated heterocycle, it being possible for these groups and rings (i), (ii) and (iii) to be substituted, R1 and R1' represent (i) an optionally substituted alkyl, acyl, aryl, alkene or alkyne group or (ii) a carbonaceous ring which is saturated or unsaturated and which is optionally substituted or aromatic or (iii) an optionally substituted, saturated or unsaturated heterocycle or a polymer chain, and p is between 2 and 10.

Other examples of transfer agents are transfer agents of the following formulae (II) and (III)

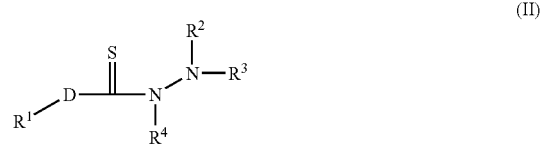

(II)

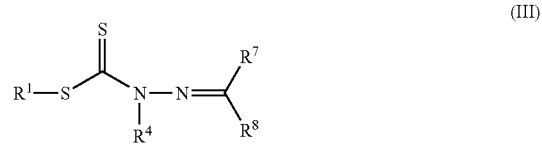

(III)

wherein

R1 is an organic group, for example a group R1 as defined above for transfer agents of formulae (I), (IA), (IB), and (IC), R2, R3, R4, R7, and R8 which are identical or different are hydrogen atoms or organic groups, optionally forming rings. Examples of R2, R3, R4, R7, and R8 organic groups include hydrocarbyls, substituted hydrocarbyls, heteroatom-containing hydrocarbyls, and substituted heteroatom-containing hydrocarbyls.

The mono-alpha-ethylenically-unsaturated monomers and their proportions are chosen in order to obtain the desire properties for the block(s). According to this process, if all the successive polymerizations are carried out in the same reactor, it is generally preferable for all the monomers used during one stage to have been consumed before the polymerization of the following stage begins, therefore before the new monomers are introduced. However, it may happen that monomers of the preceding stage are still present in the reactor during the polymerization of the following block. In this case, these monomers generally do not represent more than 5 mol % of all the monomers.

The polymerization can be carried out in an aqueous and/or organic solvent medium. The polymerization can also be carried out in a substantially neat melted form (bulk polymerization), or according to a latex type process in an aqueous medium.

Comb copolymers or grafted copolymers can be obtained by copolymerizing or by direct grafting. Direct grafting comprises free radicals polymerizing the chosen monomer (s) to form the backbone of the final product. If the couple monomer/backbone and the operating conditions are well chosen, then a transfer reaction can occur between a growing macro radical and the backbone. This reaction generates a free radical on the backbone et the graft grows form the free radical. The primary free radical generated from an initiator can as well contribute to transfer reactions.

Processes for preparing star copolymers or microgels are essentially divided in two groups. The first corresponds to forming arms or branches from a compound having several functions constituting the core ("core-first" method, (Kennedy, J. P. and coll. Macromolecules, 29, 8631 (1996), Deffieux, A. and coll. Ibid, 25, 6744, (1992), Gnanou, Y. and coll. Ibid, 31, 6748 (1998)). The second corresponds to first the arms or branches, and then linking them in or on a core to form a star copolymer ("arm-first" method). Such processes are for example described in document WO 00/02939. Other method includes polymerization form a core comprising several transfer groups, and micelles reticulation processes.

C. Optional Components

I. Anionic Polymer

A viscoelastic surfactant fluid in accordance with the invention may also comprise an anionic polymer. The anionic polymer preferably has about 8 to about 100 monomeric units and at least one negatively charged moiety. Sulfonated polymers are preferred. Representative anionic polymers include, but are not limited to polynapthalene sulfonate, sulfonated polystyrenes, and sulfonated styrene/maleic anhydride copolymers. A most preferred anionic polymer is polynapthalene sulfonate and has the following structural formula:

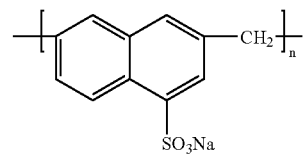

wherein "n" is an integer from about 8 to about 100. Preferred polynapthalene sulfonates have a weight average molecular weight from about 2,000 to about 20,000.

Another preferred anionic polymer is polyalkylene sulfonate having the following structural formula:

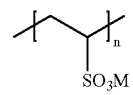

wherein "n" is an integer from about 8 to about 100. M is an inorganic or organic cation, such as alkaline metal or ammonium ions, e.g. $K^+$, $Na^+$, and $NH4^+$.

The selected anionic polymer is preferably used in an amount of about 0.1 to about 5 wt %, more preferably from about 0. 1 to about 3 wt %, and most preferably from about 0.1 to 0.5 wt % based on weight of the viscoelastic surfactant fluid. The sugar derived surfactant is preferably added to the viscoelastic surfactant from about 0.01 to about 10 wt %, from about 0.01 to about 5 wt %, more preferably from about 0.1 to about 3 wt %, and most preferably from about 0.2 to about 0.5 wt % based on weight of the viscoelastic surfactant fluid. Optimum concentrations for the selected surfactants, sugar derived surfactants, and anionic polymers can be determined experimentally for a particular viscoelastic surfactant fluid system.

II. Acids and Salts

A viscoelastic surfactant fluid in accordance with the invention may also comprise one or more components from the group of organic acids, organic acid salts, organic salts, inorganic salts and combinations thereof. This component will preferably be present in only a minor amount (e.g. less than about 20% by weight of the viscoelastic surfactant fluid). The organic acid or organic acid salt will preferably be present in the viscoelastic surfactant fluid at a weight concentration of about 0.1% to about 10%, more preferably from about 0.1% to about 7%, and even more preferably from about 0.1% to about 6%. The inorganic salt will preferably be present in the viscoelastic fluid at a weight concentration of about 0.1% to about 30%, more preferably about 0.1% to about 10%, and even more preferably from about 0.1% to about 8%. Organic salts, e.g. trimethylammonium hydrochloride and tetramethylammonium chloride, may also be used in addition to, or as a replacement for, the inorganic salts.

The organic acid is preferably a sulfonic acid or a carboxylic acid and the anionic counter-ion of the organic acid salts are preferably sulfonates or carboxylates. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Most preferred are salicylate, phthalate, p-toluene sulfonate, hydroxynaphthalene carboxylates, e.g.

5-hydroxy-1-napthoic acid, 6-hydroxy-1-napthoic acid, 7-hydroxy-1-napthoic acid, 1-hydroxy-2-naphthoic acid, preferably 3-hydroxy-2-naphthoic acid, 5-hydroxy-2-naphthoic acid, 7-hydroxy-2-naphthoic acid, and 1, 3-dihydroxy-2-naphthoic acid and 3,4-dichlorobenzoate. The organic acid or salt thereof typically aids the development of increased viscosity which is characteristic of preferred viscoelastic surfactant fluids. Without wishing to be bound by any theory unless expressly noted otherwise in context, it is thought that association of the organic acid or salt thereof with the micelle decreases the aggregation curvature of the micelle and thus promotes the formation of a worm-like or rod-like micelle.

The inorganic salts that are particularly suitable for use in the viscoelastic surfactant fluid include water-soluble potassium, sodium, and ammonium salts, such as potassium chloride and ammonium chloride. Additionally, calcium chloride, calcium bromide, magnesium and zinc halide salts may also be used. The inorganic salts may aid in the development of increased viscosity which is characteristic of preferred viscoelastic surfactant fluids. Further, the inorganic salt may assist in maintaining the stability of a geologic formation to which the fluid is exposed. Formation stability and in particular clay stability (by inhibiting hydration of the clay) is achieved at a concentration level of a few percent by weight and as such the density of viscoelastic surfactant fluid is not significantly altered by the presence of the inorganic salt unless fluid density becomes an important consideration, at which point, heavier inorganic salts may be used.

Preparation and Subterranean Formation Treatment

In hydraulic fracturing it is important for the fluid to regain viscosity as quickly as possible after exiting the high-shear region in the tubulars and entering the low-shear environment in the hydraulic fracture. Viscoelastic surfactant fluid systems have been shown to have excellent rheological properties for hydraulic fracturing applications; however, shear recovery time, not fluid viscosity, often dictates the minimum concentration of surfactant required. For example, a fluid made with a certain concentration of surfactant may show adequate viscosity for fracturing at a given temperature, but the minimal usable concentration may be high due to slow shear recovery with a lower concentration. An acceptable shear recovery time is considered to be 15 seconds. A time longer than 15 seconds will negatively impact drag reduction and proppant transport. Shortening the viscosity-recovery time makes it possible to use VES fluid systems that would otherwise not be suitable in many applications. In addition, when a rheology modifier also increases fluid viscosity, then less surfactant is needed to provide a given viscosity.

Viscoelastic surfactant fluids used in the oilfield may also contain agents that dissolve minerals and compounds, for example in formations, scale, and filter-cakes. Such agents may be, for example, hydrochloric acid, formic acid, acetic acid, lactic acid, polylactic acid, glycolic acid, polyglycolic acid, sulfamic acid, malic acid, citric acid, tartaric acid, maleic acid, methylsulfamic acid, chloroacetic acid, aminopolycarboxylic acids, 3-hydroxypropionic acid, polyaminopolycarboxylic acids, for example trisodium hydroxyethylethylenediamine triacetate, and salts of these acids and mixtures of these acids and/or salts. For sandstone treatment, the fluid also typically contains a hydrogen fluoride source. The hydrogen fluoride source may be HF itself or may be selected from ammonium fluoride and/or ammonium bifluoride or mixtures of the two; when strong acid is present the HF source may also be one or more of polyvinylammonium fluoride, polyvinylpyridinium fluoride, pyridinium fluoride, imidazolium fluoride, sodium tetrafluoroborate, ammonium tetrafluoroborate, and salts of hexafluoroantimony. When the formation-dissolving agent is a strong acid, the fluid preferably contains a corrosion inhibitor. The fluid optionally contains chelating agents for polyvalent cations, for example especially aluminum, calcium and iron (in which case the agents are often called iron sequestering agents) to prevent their precipitation. Some of the formation-dissolving agents just described are such chelating agents as well. Chelating agents are added at a concentration, for example, of about 0.5% (of active ingredient). When VES fluids contain strong acids, they are typically not gelled and display low viscosity; when the pH increases as the acid reacts with the mineral, the system gels and the viscosity increases. Such fluids may be called viscoelastic diverting acids. The rheology enhancers of the present invention may be used in viscoelastic surfactant fluid systems containing acids and chelating agents.

Preparation and use (mixing, storing, pumping, etc.) of the improved VES fluid systems containing rheology enhancers of the invention are the same as for such fluids without the rheology enhancers. For example, the order of mixing is not affected by including these rheology enhancers. Optionally, the rheology enhancers may be incorporated in surfactant concentrates (provided that they do not affect component solubilities or concentrate freezing points) so that the concentrates can be diluted with an aqueous fluid to make VES systems. This maintains the operational simplicity of the VES systems. As is normally the case in fluid formulation, laboratory tests should be run to ensure that the additives do not affect, and are not affected by, other components in the fluid (such as salts, for example). In particular, the rheology enhancers of the present invention may be used with other rheology modifiers. Adjusting the concentrations of surfactant, rheology enhancer, and other fluid components to account for the effects of other components is within the scope of the invention.

In the oilfield, the fluid may be used, as examples, as a pad fluid and/or as a carrier fluid and/or as a diverter in hydraulic fracturing; as a carrier fluid for lost circulation control agents; as a carrier fluid for gravel packing; and as a diverter or a main fluid in acidizing and acid fracturing.

A viscoelastic surfactant fluid in accordance with the invention may be prepared and used to treat subterranean formations in any suitable manner. In one embodiment of the invention, a viscoelastic surfactant fluid comprising a viscoelastic surfactant as described above in section A and an enhanced shear recovery agent as described above in section B is mixed with or added to an aqueous fluid. The aqueous fluid may comprise the optional ingredients described above in section C, for example, the aqueous fluid may comprise a water-soluble inorganic salt, e.g. potassium chloride or ammonium chloride and/or at least one organic acid, water-soluble organic acid salt or organic salt, e.g. TMAC. The aqueous fluid mixed with the viscoelastic surfactant fluid, may be injected down a well, for example, to treat subterranean formations. An anionic polymer may be added to the aqueous fluid and/or the viscoelastic surfactant fluid prior to injection or during injection.

In another embodiment, the enhanced shear recovery agent may be added to an aqueous fluid containing for example the optional dissolved inorganic salt, organic acid, organic salt, organic acid salt and combinations thereof. The resulting enhanced shear recovery agent containing aqueous fluid is then mixed with a viscoelastic surfactant and injected down a well. Anionic polymer may optionally be added to the aqueous fluid and/or the viscoelastic surfactant fluid.

In yet another embodiment the viscoelastic surfactant fluid contains a mixture of a viscoelastic surfactant and enhanced shear recovery agent and an aqueous fluid. Such an aqueous fluid may contain at least one of the optional components, for example, dissolved organic salts, organic acids, organic acid salts and inorganic salts.

In still yet another embodiment of the invention a viscoelastic surfactant fluid is prepared by mixing water or solvent with a viscoelastic surfactant, an enhanced shear recovery agent and other optional components; and a proppant. The propant may be 20-40 mesh bauxite, sand, bauxite, glass beads, etc suspended in the aqueous phase of the viscoelastic surfactant fluid. Such a viscoelastic surfactant fluid may then be injected down a well.

Standard mixing procedures known in the art can be employed since heating of the solution and special agitation conditions are normally not necessary. Of course, if used under conditions of extreme cold such as found in Alaska, normal heating procedures should be employed. Further, a defoaming agent such as a polyglycol maybe employed to prevent undesirable foaming during the preparation of the viscoelastic fluid. If a foam or gas-energized fluid is desired, any gas such as air, nitrogen, carbon dioxide, super critical carbon dioxide and the like may be added. Supercritical carbon dioxide emulsions may be also added.

The following examples are presented to illustrate the preparation and properties of aqueous viscoelastic surfactant based hydraulic fluids and should not be construed to limit the scope of the invention, unless otherwise expressly indicated in the appended claims. All percentages, concentrations, ratios, parts, etc. are by weight unless otherwise noted or apparent from the context of their use.

EXAMPLES

Viscoelastic surfactant fluids of the present invention were prepared and were found to have shortened shear recovery times.

The zwitterionic surfactant employed was erucyl amidopropyl betaine (EAB) (manufactured by Rhodia Inc.). The alkylpolyglucoside surfactant was Glucopon 225 DK (manufactured by Cognis Corp.). The cationic surfactant employed was Alkaquat DMB-451 (benzyl triammonium chloride made by Rhodia Inc.). All ingredients were formulated by mixing.

Two viscoelastic surfactant fluids of the following formulations were tested:

34.5 wt % EAB/9.1% Glucopon 225DK(balance is solvents); and 35.3 wt % EAB/4.65 wt % Glucopon 225DK/ 2.32 wt % Alkaquat DMB-451 (balance is solvents). The two formulations had very good stability and flowability in the temperature range from 20° F. to 150° F.

The viscoelastic surfactant fluids formulated at 1.52% wt % active (4 wt % surfactant) showed very good viscosity performance up to 240° F. with very good shear recovery (less than 30 seconds in 2% KCl solution). These viscoelastic surfactant fluids were compatible with 2 wt % KCl (potassium chloride), and 0.1 wt % TMAC (trimethyl ammonium chloride).

Four viscoelastic surfactant fluids of the present invention were formulated as follows:

I) 1.52 wt % EAB in 2 wt % KCl (balance is solvents), which is used as a comparative viscoelastic surfactant fluid and does not contain sugar derived surfactant;

II) 1.52 wt % EAB and 0.4 wt % Glucopon 225DK in 2 wt % KCl (balance is solvents);

III) 1.52 wt % EAB, 0.1 wt % Alkaquat DMB-451 and 0.2 wt % Glucopon 225DK in 2 wt % KCl (balance is solvents); and IV) 1.52 wt % EAB, 0.1 wt % Alkaquat DMB-451 and 0.2 wt % Glucopon 225DK in 0.1 wt % TMAC (balance is solvents).

The shear recovery time for fluids I, II, III and IV are 180, 10, 25, and 2 seconds, respectively. As seen from these results the sugar derived surfactant containing viscoelastic surfactant fluids have enhanced shear recovery.

EXAMPLE II

The following formulated packages of viscoelastic surfactants and polyDEGA homopolymer were tested:
Control: 38.00% EAB/62.00% solvents
Product A: 37.99% EAB/0.03% polyDEGA(6k)/61.98% solvents
Product B: 37.99% EAB/0.04% polyDEGA(35k)/61.99% solvents
Product C: 34.20% EAB/0.40% polyDEGA(35k)/65.40% solvents
Product D: 37.99% EAB/0.03% polyDEGA(50k)/61.98% solvents A Control having 38.00% EAB and 62.00% solvents was used in this example for comparative purposes. The shear recovery time for the Control at 1.5% by weight of the package (0.57% actives) was 300 seconds.

The shear recovery times for Products A, B and D at 1.5% by weight of the package (0.57% actives) were 0 seconds. The shear recovery time for Product C at 0.52% actives was 0 seconds. The 0 second shear recovery times were maintained in the following aqueous solution conditions: 10% KCl, 10% NaCl, 0.1% TMAC (Trimethyl ammonium chloride), Sea Water, and 10.4 ppg high brine. Furthermore these aqueous solutions showed good viscosity performance up to 150° F. When Products A-D were used at 4% by weight of the package, the shear recovery was instant and outstanding viscosity performance was exhibited up to 250° F.

Product E: 35.62% EAB/0.04% polyDEGA (35k)/5.00% Glucopon 225DK/59.34% solvents

Product E provided instant shear recovery when used at 1.5% by weight of the package and was compatible in a solution of 10% KCl, 10% NaCl, 0.1% TMAC (Trimethyl ammonium chloride), Sea Water, and 10.4 ppg high brine. The viscosity performance was greatly enhanced with the addition of glucopon 225 DK compared to Product B The invention has been described in the more limited aspects of preferred embodiments hereof, including numerous examples. Other embodiments have been suggested and still others may occur to those skilled in the art upon a reading and understanding of the specification. It is intended that all such embodiments be included within the scope of this invention.

What is claimed is:

1. A viscoelastic surfactant fluid comprising:
(i) a surfactant selected from the group consisting of amphoteric surfactant, zwitterionic surfactant, anionic surfactant, nonionic surfactant, cationic surfactant, and combinations thereof; and
(ii) an enhanced shear recovery agent to reduce shear recovery time, whereby said enhanced shear recovery agent is an ethyleneglycolethyletheracrylate derived copolymer.

2. The fluid of claim 1, further comprising a component selected from the group consisting of an anionic polymer, a propant, organic acids, organic acid salts, organic salts, inorganic salts and combinations thereof.

3. The fluid of claim 1 wherein said ethyleneglycolethyletheracrylate is selected from the group consisting of diethyleneglycolethyletheracrylate, nonethyleneglycolmethyletheracrylate, poly-23-ethyleneglycolethyletheracrylate, and combinations thereof.

4. The fluid of claim 1, further comprising an acid selected from the group consisting of hydrochloric acid, hydrofluoric acid, formic acid, acetic acid, polylactic acid, polyglycolic acid, lactic acid, glycolic acid, sulfamic acid, malic acid, citric acid, tartaric acid, maleic acid, methylsulfamic acid, chloroacetic acid, and combinations thereof.

5. A method of treating a subterranean formation comprising: injecting down a well an aqueous fluid comprising a viscoelastic surfactant and an enhanced shear recovery agent comprising an ethyleneglycolethyletheracrylate derived copolymer.

6. An oilfield treatment method comprising the steps of:
a). providing a fluid comprising a viscoelastic surfactant selected from the group consisting of amphoteric surfactant, zwitterionic surfactant, anionic surfactant, nonionic surfactant, cationic surfactant, and combinations thereof,
b). adding to the fluid a rheology enhancer in a concentration sufficient to shorten the shear recovery time of said fluid, said rheology enhancer being selected an ethyleneglycolethyletheracrylate derived copolymer; and
c). injecting said fluid down a well.

7. The method of claim 6 further wherein said rheology enhancer increases the viscosity of said fluid.

8. The method of claim 6 wherein said fluid further comprises an acid selected from the group consisting of hydrochloric acid, hydrofluoric acid, formic acid, acetic acid, polylactic acid, polyglycolic acid, lactic acid, glycolic acid, sulfamic acid, malic acid, citric acid, tartaric acid, maleic acid, methylsulfamic acid, chloroacetic acid, and combinations thereof.

9. The fluid of claim 1 having a shear recovery time of not longer than 15 seconds.

10. The method of claim 6 comprising adding to the fluid sufficient of said rheology enhancer to shorten the shear recovery time of said fluid to 15 seconds or less.

11. The method of claim 5 wherein the enhanced shear recovery agent is present in sufficient amount to shorten the shear recovery time of said aqueous fluid to 15 seconds or less.

* * * * *